(12) United States Patent
Baruch et al.

(10) Patent No.: US 12,360,917 B2
(45) Date of Patent: Jul. 15, 2025

(54) SYSTEM AND METHOD FOR FLUSHING DATA USING MAPPING PAGE OWNERSHIP

(71) Applicant: Dell Products L.P., Round Rock, TX (US)

(72) Inventors: Oran Baruch, Tel Aviv Yafo (IL); Vamsi Vankamamidi, Hopkinton, MA (US); Maor Rahamim, Ramla (IL)

(73) Assignee: Dell Products L.P., Round Rock, TX (US)

( * ) Notice: Subject to any disclaimer, the term of this patent is extended or adjusted under 35 U.S.C. 154(b) by 100 days.

(21) Appl. No.: 18/488,213

(22) Filed: Oct. 17, 2023

(65) Prior Publication Data

US 2025/0123970 A1 Apr. 17, 2025

(51) Int. Cl.
*G06F 12/1027* (2016.01)

(52) U.S. Cl.
CPC .. *G06F 12/1027* (2013.01); *G06F 2212/1032* (2013.01); *G06F 2212/152* (2013.01)

(58) Field of Classification Search
CPC ......... G06F 12/1027; G06F 2212/1032; G06F 2212/152
See application file for complete search history.

(56) References Cited

U.S. PATENT DOCUMENTS

| 2010/0042776 | A1* | 2/2010 | Seo | G06F 12/123 |
| | | | | 711/E12.008 |
| 2012/0191897 | A1* | 7/2012 | Yang | G06F 12/0246 |
| | | | | 711/E12.008 |
| 2019/0155726 | A1* | 5/2019 | Bhatia | G06F 12/0246 |
| 2021/0173791 | A1* | 6/2021 | Kim | G06F 12/0246 |

\* cited by examiner

*Primary Examiner* — Jason W Blust
(74) *Attorney, Agent, or Firm* — Brian J. Colandreo; Heath M. Sargeant; Holland & Knight LLP

(57) ABSTRACT

A method, computer program product, and computing system for generating a plurality of page buffers from a log memory system of the storage system using a persistent memory organization policy. A plurality of physical layer blocks (PLBs) are generated from the log memory system using the persistent memory organization policy. A set of page buffers are allocated from the plurality of page buffers to a first mapping page of a plurality of mapping pages. A PLB is allocated from the plurality of PLBs to a second mapping page of the plurality of mapping pages. One or more IO requests are processed using one or more of the first mapping page and the second mapping page.

20 Claims, 5 Drawing Sheets

SYSTEM AND METHOD FOR FLUSHING DATA USING MAPPING PAGE OWNERSHIP

BACKGROUND

Storing and safeguarding electronic content may be beneficial in modern business and elsewhere. Accordingly, various methodologies may be employed to protect and distribute such electronic content.

For example, storage nodes may include a cache component and a log component to handle input/output (IO) request for storage in persistent memory. The log component may include two methods of persisting the data: a page buffer and a physical layer block (PLB). However, as page buffers and PLBs have distinct flushing processes, mixing page buffers and PLBs in the same logical, mapping pages risks requiring serialized flushing of each type of data. This may cause performance degradation. Additionally, this may result in less utilized PLBs in the final storage which could cause fragmentation.

SUMMARY OF DISCLOSURE

In one example implementation, a computer-implemented method executed on a computing device may include, but is not limited to, generating a plurality of page buffers from a log memory system of the storage system using a persistent memory organization policy. A plurality of physical layer blocks (PLBs) are generated from the log memory system using the persistent memory organization policy. A set of page buffers are allocated from the plurality of page buffers to a first mapping page of a plurality of mapping pages. A PLB is allocated from the plurality of PLBs to a second mapping page of the plurality of mapping pages. One or more IO requests are processed using one or more of the first mapping page and the second mapping page.

One or more of the following example features may be included. The plurality of page buffers may be located in non-volatile random-access memory (NVRAM) persistent storage within the log memory system. The plurality of PLBs may be located in solid state drive (SSD) persistent storage within the log memory system. Processing the one or more IO requests using the first mapping page may include flushing data from the first mapping page by flushing the set of page buffers to the storage system. Processing the one or more IO requests using the second mapping page may include flushing data from the second mapping page by flushing the PLB to the storage system. A ratio of the plurality of page buffers to the plurality of PLBs within the log memory system may be monitored. The persistent memory organization policy may be iteratively adjusted based upon, at least in part, the ratio of the plurality of page buffers to the plurality of PLBs within the log memory system.

In another example implementation, a computer program product resides on a computer readable medium that has a plurality of instructions stored on it. When executed by a processor, the instructions cause the processor to perform operations that may include, but are not limited to, generating a plurality of page buffers from a log memory system of the storage system using a persistent memory organization policy. A plurality of physical layer blocks (PLBs) are generated from the log memory system using the persistent memory organization policy. A set of page buffers are allocated from the plurality of page buffers to a first mapping page of a plurality of mapping pages. A PLB is allocated from the plurality of PLBs to a second mapping page of the plurality of mapping pages. One or more IO requests are processed using one or more of the first mapping page and the second mapping page.

One or more of the following example features may be included. The plurality of page buffers may be located in non-volatile random-access memory (NVRAM) persistent storage within the log memory system. The plurality of PLBs may be located in solid state drive (SSD) persistent storage within the log memory system. Processing the one or more IO requests using the first mapping page may include flushing data from the first mapping page by flushing the set of page buffers to the storage system. Processing the one or more IO requests using the second mapping page may include flushing data from the second mapping page by flushing the PLB to the storage system. A ratio of the plurality of page buffers to the plurality of PLBs within the log memory system may be monitored. The persistent memory organization policy may be iteratively adjusted based upon, at least in part, the ratio of the plurality of page buffers to the plurality of PLBs within the log memory system.

In another example implementation, a computing system includes at least one processor and at least one memory architecture coupled with the at least one processor, wherein the at least one processor is configured to generate a plurality of page buffers from a log memory system of the storage system using a persistent memory organization policy. A plurality of physical layer blocks (PLBs) are generated from the log memory system using the persistent memory organization policy. A set of page buffers are allocated from the plurality of page buffers to a first mapping page of a plurality of mapping pages. A PLB is allocated from the plurality of PLBs to a second mapping page of the plurality of mapping pages. One or more IO requests are processed using one or more of the first mapping page and the second mapping page.

One or more of the following example features may be included. The plurality of page buffers may be located in non-volatile random-access memory (NVRAM) persistent storage within the log memory system. The plurality of PLBs may be located in solid state drive (SSD) persistent storage within the log memory system. Processing the one or more IO requests using the first mapping page may include flushing data from the first mapping page by flushing the set of page buffers to the storage system. Processing the one or more IO requests using the second mapping page may include flushing data from the second mapping page by flushing the PLB to the storage system. A ratio of the plurality of page buffers to the plurality of PLBs within the log memory system may be monitored. The persistent memory organization policy may be iteratively adjusted based upon, at least in part, the ratio of the plurality of page buffers to the plurality of PLBs within the log memory system.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

System Overview

Figure 1:
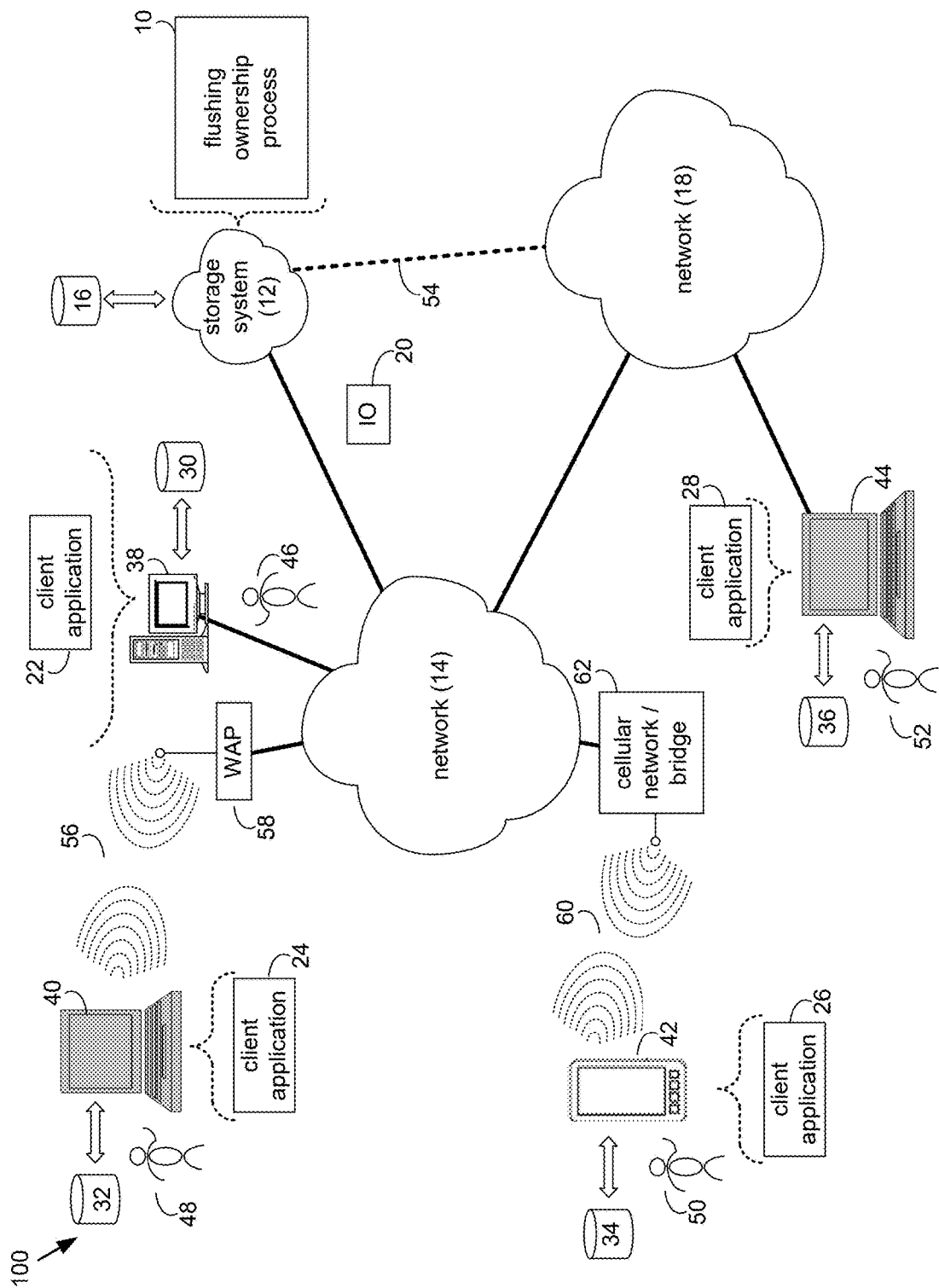
FIG. 1 is an example diagrammatic view of a storage system and a flush ownership process coupled to a distributed computing network according to one or more example implementations of the disclosure.

Referring to FIG. 1, there is shown flush ownership process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a minicomputer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of flush ownership process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random-access memory (RAM); a read-only memory (ROM); and all forms of flash memory storage devices. Additionally/alternatively, some portions of the instruction sets and subroutines of flush ownership process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g., IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a flush ownership process, such as flush ownership process 10 of FIG. 1, may include but is not limited to, generating a plurality of page buffers from a log memory system of the storage system using a persistent memory organization policy. A plurality of physical layer blocks (PLBs) are generated from the log memory system using the persistent memory organization policy. A set of page buffers are allocated from the plurality of page buffers to a first mapping page of a plurality of mapping pages. A PLB is allocated from the plurality of PLBs to a second mapping page of the plurality of mapping pages. One or more IO requests are processed using one or more of the first mapping page and the second mapping page.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
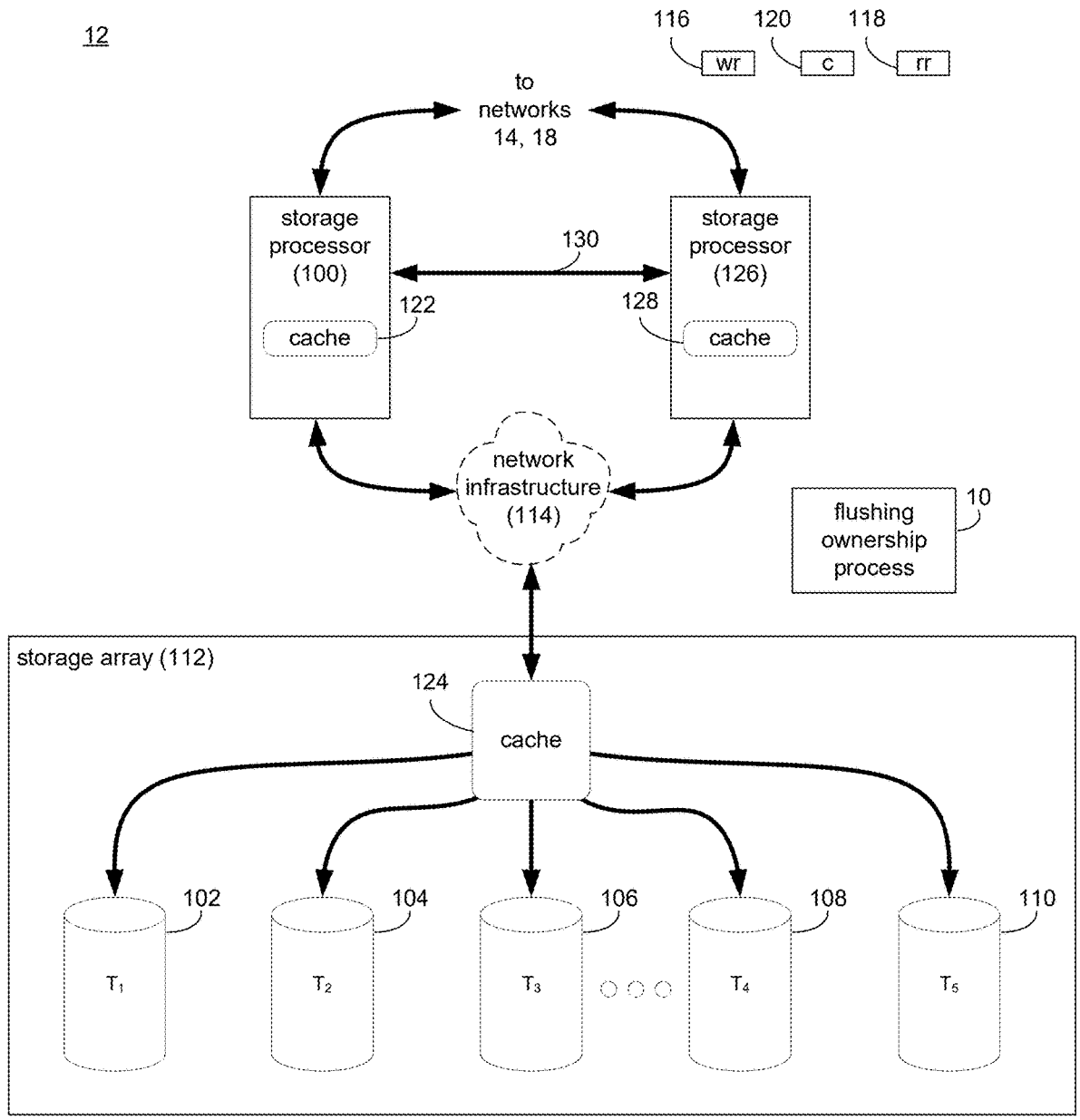
FIGS. 2-3 are example diagrammatic views of the storage system of FIG. 1 according to one or more example implementations of the disclosure.

The Storage System:

Referring also to FIG. 2, storage system 12 may include storage processor 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g., storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g., the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g., the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of flush ownership process 10. The instruction sets and subroutines of flush ownership process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random-access memory (RAM); a read-only memory (ROM); and all forms of flash memory storage devices. As discussed above, some portions of the instruction sets and subroutines of flush ownership process 10 may be stored on storage devices (and/or executed by processors and memory architectures) that are external to storage system 12.

As discussed above, various IO requests (e.g., IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e., a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g., one or more of storage targets 102, 104, 106, 108, and coded target 110.

As discussed above, the instruction sets and subroutines of flush ownership process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of flush ownership process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g., one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

In some implementations, storage system 12 may include multi-node active/active storage clusters configured to provide high availability to a user. As is known in the art, the term "high availability" may generally refer to systems or components that are durable and likely to operate continuously without failure for a long time. For example, an active/active storage cluster may be made up of at least two nodes (e.g., storage processors 100, 126), both actively running the same kind of service(s) simultaneously. One purpose of an active-active cluster may be to achieve load balancing. Load balancing may distribute workloads across all nodes in order to prevent any single node from getting overloaded. Because there are more nodes available to serve, there will also be a marked improvement in throughput and response times. Another purpose of an active-active cluster may be to provide at least one active node in the event that one of the nodes in the active-active cluster fails.

In some implementations, storage processor 126 may function like storage processor 100. For example, during operation of storage processor 126, content 118 to be written to storage system 12 may be processed by storage processor 126. Additionally/alternatively and when storage processor 126 is configured as an application server, content 118 to be written to storage system 12 may be internally generated by storage processor 126.

Storage processor 126 may include frontend cache memory system 128. Examples of frontend cache memory system 128 may include but are not limited to a volatile, solid-state, cache memory system (e.g., a dynamic RAM cache memory system) and/or a non-volatile, solid-state, cache memory system (e.g., a flash-based, cache memory system).

Storage processor 126 may initially store content 118 within frontend cache memory system 126. Depending upon the manner in which frontend cache memory system 128 is configured, storage processor 126 may immediately write content 118 to data array 112 (if frontend cache memory system 128 is configured as a write-through cache) or may subsequently write content 118 to data array 112 (if frontend cache memory system 128 is configured as a write-back cache).

In some implementations, the instruction sets and subroutines of flush ownership process 10, which may be stored on storage device 16 included within storage system 12, may be executed by one or more processors (not shown) and one or more memory architectures (not shown) included within storage system 12. Accordingly, in addition to being executed on storage processor 126, some or all of the instruction sets and subroutines of flush ownership process 10 may be executed by one or more processors (not shown) and one or more memory architectures (not shown) included within data array 112.

Further and as discussed above, during the operation of data array 112, content (e.g., content 118) to be written to data array 112 may be received from storage processor 126 and initially stored within backend cache memory system 124 prior to being stored on e.g., one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

As discussed above, storage processor 100 and storage processor 126 may be configured in an active/active configuration where processing of data by one storage processor may be synchronized to the other storage processor. For example, data may be synchronized between each storage processor via a separate link or connection (e.g., connection 130).

Metadata Architecture:

In the context of storage systems, metadata may generally include useful internal information managed by a storage array to describe and locate user data. All modern arrays abstract the physical media and present logical (virtualized) addresses to clients in the form of LUNs. The mapping between the logical address and physical address is a form of metadata that the array needs to manage. That is typically the most common form of metadata for SAN storage systems. Newer architectures manage additional metadata to implement additional capabilities. For example, snapshots, change tracking for efficient remote replication, deduplication pointers, and compression all involve managing some form of metadata.

The classic metadata structure of traditional storage systems directly links a Logical Address of a block to the physical location of the block. In this metadata structure, every logical block written, has a physical block linked directly to it. In addition, as most traditional storage systems were architected for a spinning disk storage medium optimized for sequential writes the address of the logical address affects the physical location that the data is stored. This can lead to an unbalanced storage array that can suffer from hot-spots as specific address space ranges may experience more performance/input-output operations per second (IOPs) than other address space ranges.

Embodiments of the present disclosure may support a flash/random access medium. For example, embodiments of the present disclosure may include a metadata structure that completely decouples the Logical Block Address space address from the physical one. This is done by leveraging a multi-layer architecture.

Figure 3:
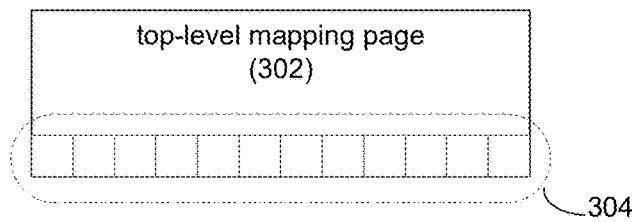
Figure 3:
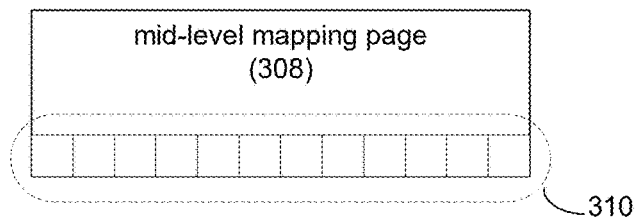
Figure 3:
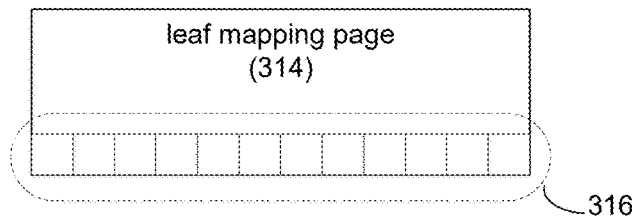
Figure 3:
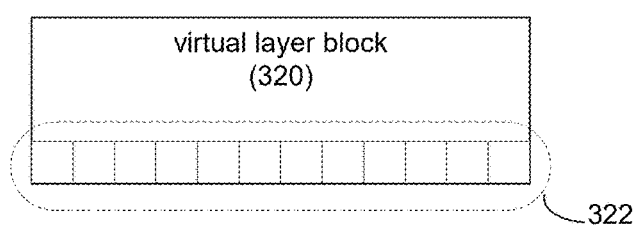
Figure 3:
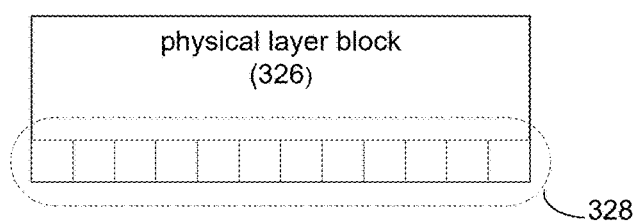

Referring also to FIG. 3, a storage system may generally include a mapper layer which is structured as a file system with various layers of pages and blocks. In some implementations, the combination of various metadata layers mapper layers may be referred to as a mapper metadata tree. While the following example includes metadata "blocks", it will be appreciated that other units of data storage may be used within the scope of the present disclosure. In some implementations, a top-level mapping page layer (e.g., top-level mapping page layer 300) may include top-level mapping page pages (e.g., top-level mapping page 302) with a plurality of entries (e.g., plurality of entries 304) that map or point to a plurality of entries of one or more mid-level mapping pages. A mid-level mapping page layer (e.g., mid-level mapping page layer 306) may include mid-level mapping page pages (e.g., mid-level mapping page 308) with a plurality of entries (e.g., plurality of entries 310) that map or point to a plurality of entries of one or more leaf mapping pages. A leaf mapping page layer (e.g., leaf mapping page layer 312) may include leaf mapping page pages (e.g., leaf mapping page 314) with a plurality of entries (e.g., plurality of entries 316) that map or point to a plurality of entries of one or more virtual layer blocks. Leaf mapping page layer 312 may represent various ranges of Logical Block Addresses (LBAs). For example, each entry of the plurality of entries (e.g., plurality of entries 316) of the leaf mapping page (e.g., leaf mapping page 314) may be associated with a LBA range. In some implementations, the combination of top-level mapping page layer 300, mid-level mapping page layer 306, and leaf mapping page layer 312 may be organized in a "tree" data structure where each leaf mapping page is a "leaf" of the "tree" data structure that corresponds to a specific LBA range. Accordingly, each leaf mapping page (e.g., leaf mapping page 314) may hold a mapping of a LBA to a virtual layer block. It will be appreciated that other data structures may be used within the scope of the present disclosure to organize the first layer.

In some implementations, a virtual layer block layer (e.g., second layer 318) may include virtual layer blocks (e.g., virtual layer block 320) with a plurality of entries (e.g., plurality of entries 322) that map to a plurality of entries of one or more physical layer blocks. The virtual layer block layer (e.g., virtual layer block layer 318) may generally isolate the logical address of a block from the physical location of the block. For example, a virtual layer block (e.g., virtual layer block 308) may encapsulate the physical location of user data and allow relocation without updating leaf mapping pages (e.g., leaf mapping page 314). Accordingly, the virtual layer block layer (e.g., virtual layer block layer 318) may decouple the Logical Block Address space address from the physical one.

In some implementations, a physical block layer (e.g., physical block layer 324) may include physical layer blocks (e.g., physical layer block 326) with a plurality of entries or portions (e.g., plurality of entries 328) that are configured to store user data. In this manner, physical block layer 324 may describe the physical location of user data in a storage system. In some implementations, each physical block layer (e.g., physical layer block 326) may have a predefined amount of storage capacity for storing data (e.g., user data).

Figure 4:
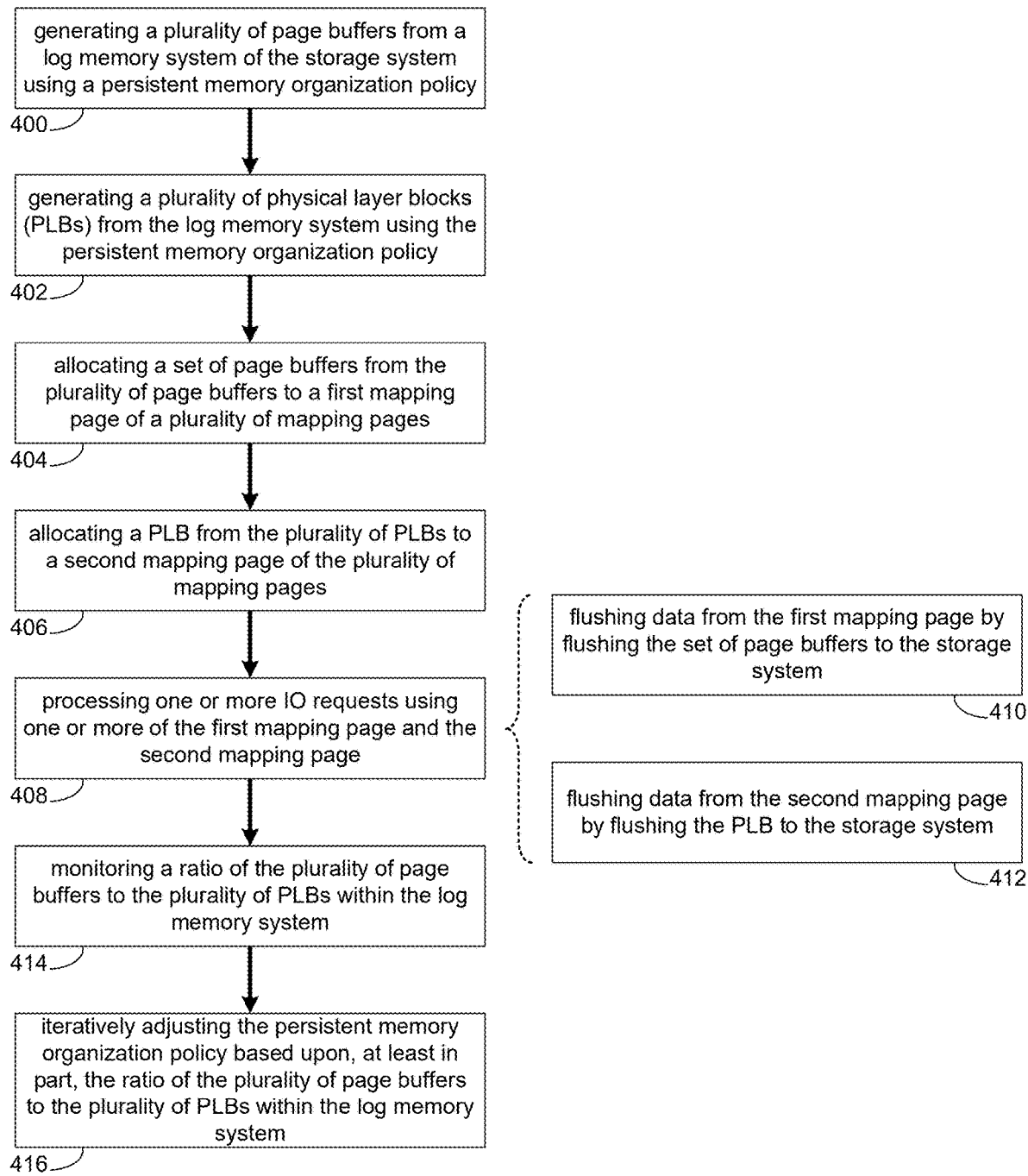
FIG. 4 is an example flowchart of the flush ownership process of FIG. 1 according to one or more example implementations of the disclosure.
Figure 5:
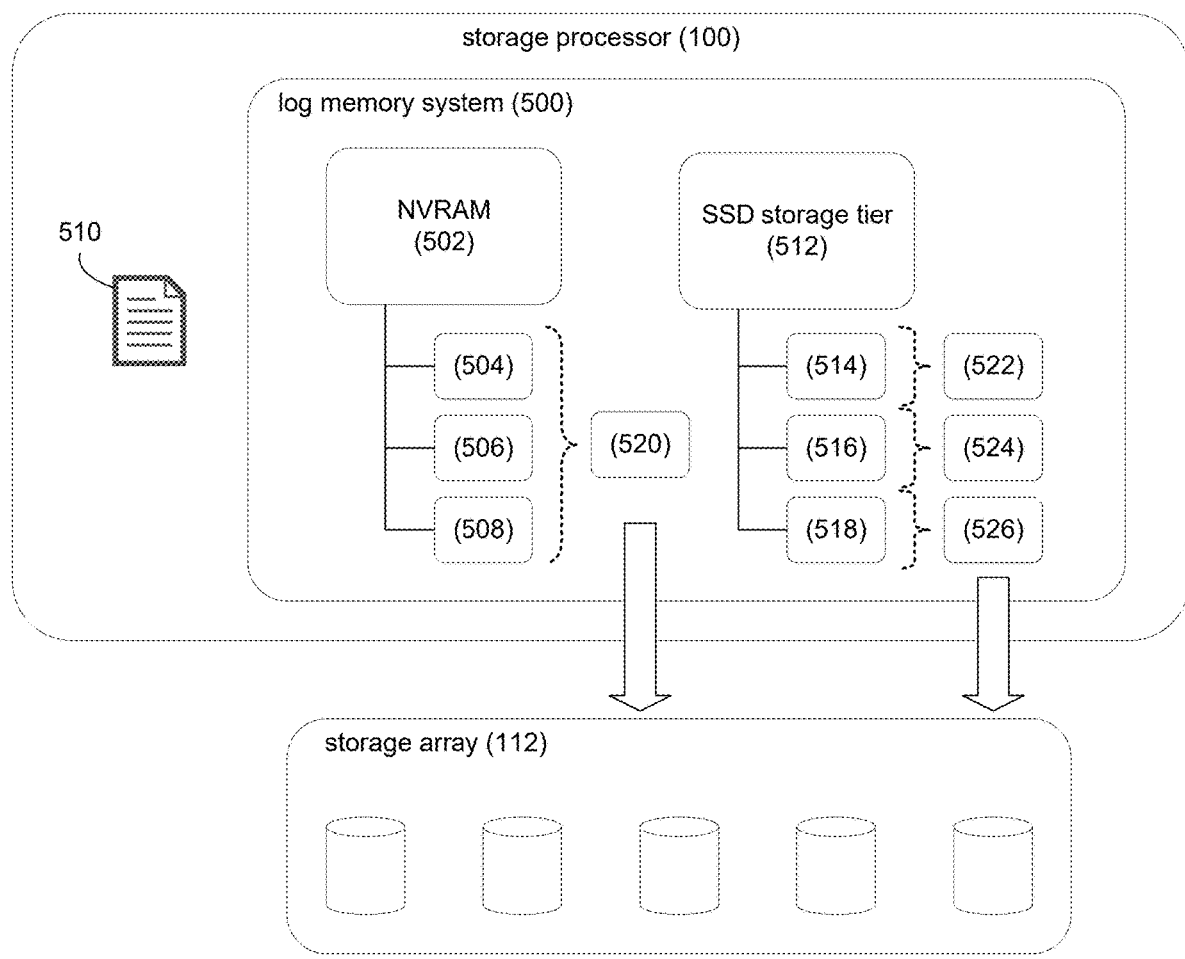
FIG. 5 is an example diagrammatic view of the flush ownership process of FIG. 1 according to one or more example implementations of the disclosure.

The Flush Ownership Process:

Referring also to FIGS. 4-5 and in some implementations, flush ownership process 10 generates 400 a plurality of page buffers from a log memory system of the storage system using a persistent memory organization policy. A plurality of physical layer blocks (PLBs) are generated 402 from the log memory system using the persistent memory organization policy. A set of page buffers are allocated 404 from the plurality of page buffers to a first mapping page of a plurality of mapping pages. A PLB is allocated 406 from the plurality of PLBs to a second mapping page of the plurality of mapping pages. One or more IO requests are processed 408 using one or more of the first mapping page and the second mapping page.

For example, an active-active storage system may include two storage processors (e.g., storage processors 100, 126) that process one or more input/output (IO) requests. Each storage processor (e.g., storage processors 100, 126) may include a cache memory system and a log memory structure. The cache memory system may store the most recent IO writes which are in the persistent memory and are not yet flushed into the main solid-state drive (SSD) storage. The log memory system has two approaches for persisting data: a page buffer located in non-volatile random-access memory (NVRAM), and a physical layer block (PLB) located in a SSD storage tier.

When the storage system is a page buffer only system, flushing of page buffers is performed by binding the logical space (e.g., mapping pages) which point into the physical space (e.g., the SSD space) in a certain granularity (e.g., a four kilobyte leaf mapping page, where 512 leaf mapping pages map to a mid-level mapping page and 512 mid-level mapping pages map to a top-level mapping page). In this example, flush ownership process 10 may flush a mid-level mapping page by aggregating pages from the dirty cache belonging to the mid-level mapping page and moving those page buffers corresponding to the mid-level mapping page from the dirty cache into the final SSD storage. This solution is effective when there are only page buffers because pages are sorted by their address; less locking is needed for the mapping pages; and the data which resides at the final storage in PLBs, are close in its logical address and physical location.

When the dirty cache and log memory system are extended to use PLBs in addition to page buffer, there are issues flushing the data smoothly into final storage. For example, mapping pages (e.g., leaf mapping pages and/or mid-level mapping pages) can have mixed page buffer pages and PLB pages. This may require serializing the flush process of both the PLB from SSD and the page buffer from NVRAM. For example, conventional approaches flush page buffers and then flush PLBs then page buffer again then PLB again because the entries are mixed on the same mapping page and flushing them at the same time could cause a data corruption and inconsistency in the final storage because of the log order could be broken because the data is flushed in the wrong order.

In some implementations, conventional approaches may result in performance degradation since flushing is serialized and, consequently, slower. This may also result in fewer utilized PLBs in the final storage leading to fragmentation. Accordingly, implementations of the present disclosure dynamically allocate page buffers and PLBs into certain mapping pages such that flushing of PLBs and page buffers is optimized.

In some implementations, flush ownership process 10 generates 400 a plurality of page buffers from a log memory system of the storage system using a persistent memory organization policy. A page buffer is a portion of memory within a log memory system that temporarily "buffers" data being written to the storage system. For example, when a write IO request is processed, flush ownership process 10 places the data to be written in one or more page buffers. The page buffers are stored in persistent memory within the log memory system such that the data endures a power-loss event. In some implementations, the page buffers are located in non-volatile random-access memory (NVRAM) persistent storage within the log memory system. Referring also to FIG. 5, a log memory system (e.g., log memory system 500) is shown with a NVRAM persistent storage (e.g., NVRAM persistent storage 502). Flush ownership process 10 may generate 400 a plurality of page buffers (e.g., page buffers 504, 506, 508) within NVRAM persistent storage 502. In some implementations, flush ownership process 10 uses a persistent memory organization policy (e.g., persistent memory organization policy 510) to generate 400 the plurality of page buffers (e.g., page buffers 504, 506, 508). For example, persistent memory organization policy 510 defines a percentage of page buffers and a percentage of PLBs to generate for processing IO requests on a storage system. In some implementations, persistent memory organization policy 510 includes a default percentage of page buffers to generate and a default percentage of PLBs to generate. The percentage of page buffers and PLBs may be user-defined. As will be discussed in greater detail below, flush ownership process 10 may dynamically adjust persistent memory organization policy 510 in response to monitoring the actual numbers of page buffers and PLBs used by storage system 12.

In some implementations, flush ownership process 10 generates 402 a plurality of physical layer blocks (PLBs) from the log memory system using the persistent memory organization policy. As discussed above and as shown in FIG. 3, a physical layer block (PLB) (e.g., physical layer block 326) includes a plurality of entries or portions (e.g., plurality of entries 328) that are configured to store user data. In this manner, physical block layer 324 may describe the physical location of user data in a storage system. In some implementations, each physical layer block (e.g., physical layer block 326) may have a predefined amount of storage capacity for storing data (e.g., user data). In one example, the storage capacity for the PLB is two megabytes. However, it will be appreciated that PLBs may have various storage capacities within the scope of the present disclosure. As described above, PLBs may represent physical data storage in a metadata structure that decouples the Logical Block Address (LBA) space address from the physical address space of the PLBs.

In some implementations, the plurality of PLBs are located in solid state drive (SSD) persistent storage within the log memory system. Referring again to FIG. 5, a log memory system (e.g., log memory system 500) is shown with solid state drive (SSD) persistent storage tier (e.g., SSD storage tier 512). Flush ownership process 10 may generate 402 a plurality of PLBs (e.g., PLBs 514, 516, 518) within SSD storage tier 512. In some implementations, flush ownership process 10 uses persistent memory organization policy 510 to generate 402 the plurality of PLBs (e.g., PLBs 514, 516, 518). For example and described above, persistent memory organization policy 510 may define the percentage of PLBs to generate 402 for storage system 12.

In some implementations, flush ownership process 10 allocates 404 a set of page buffers from the plurality of page buffers to a first mapping page of a plurality of mapping pages. As described above, a storage system may generally include a mapper layer which is structured as a file system with various layers of pages and blocks. In some implementations, the combination of various metadata layers mapper layers may be referred to as a mapper metadata tree. In some implementations, a top-level mapping page layer (e.g., top-level mapping page layer 300) may include top-level mapping page pages (e.g., top-level mapping page 302) with a plurality of entries (e.g., plurality of entries 304) that map or point to a plurality of entries of one or more mid-level mapping pages. A mid-level mapping page layer (e.g., mid-level mapping page layer 306) may include mid-level mapping page pages (e.g., mid-level mapping page 308) with a plurality of entries (e.g., plurality of entries 310) that map or point to a plurality of entries of one or more leaf mapping pages. A leaf mapping page layer (e.g., leaf mapping page layer 312) may include leaf mapping page pages (e.g., leaf mapping page 314) with a plurality of entries (e.g., plurality of entries 316) that map or point to a plurality of entries of one or more virtual layer blocks. Leaf mapping page layer 312 may represent various ranges of Logical Block Addresses (LBAs). Accordingly, a mapping page may be a top-level mapping page, a mid-level mapping page, or a leaf mapping page within the scope of the present disclosure.

Allocating 404 a set of page buffers to a first mapping page may generally include defining the ownership of the set of page buffers to the first mapping page. For example, flush ownership process 10 determines the ownership of each mapping page (e.g., a top-level mapping page, a mid-level mapping page, or a leaf mapping page). In some implementations, flush ownership process 10 allocates 404 a set of page buffers to a first mapping page when ingesting or processing an IO request. For example, when an IO request is processed, flush ownership process 10 uses persistent memory organization policy 510 to determine whether the IO request is processed using the set of page buffers or using the set of PLBs. As described above, flush ownership process 10 may allocate a set of page buffers together such that subsequent processing of the page buffers results in the most efficient flushing possible. For example, as PLBs and page buffers have distinct flushing procedures, flush ownership process 10 allocates a set of page buffers (e.g., page buffers 504, 506, 508) to a first mapping page (e.g., mapping page 520) such that page buffers 504, 506, 508 are processed (e.g., flushed) together. In some implementations, flush ownership process 10 allocates 404 chunks or predefined amounts of page buffers to a first mapping page. For example, flush ownership process 10 may define chunks of page buffers to allocate 404 to contiguous mapping pages. In one example, suppose flush ownership process 10 is allocating 404 page buffers 504, 506, 508 to mapping pages. In this example, suppose a plurality of leaf mapping pages are contiguous and all map to the same mid-level mapping page. Flush ownership process 10 may allocate 404 page buffer 504 to a first leaf mapping page; page buffer 506 to a second leaf mapping page; and page buffer 508 to a third leaf mapping page. In this example, flush ownership process 10 allocates 404 page buffers 504, 506, 508 to contiguous leaf mapping pages to allow for mid-level mapping page-based flushing (i.e., by flushing at the mid-level mapping page granularity).

In some implementations, flush ownership process 10 allocates 406 a PLB from the plurality of PLBs to a second mapping page of the plurality of mapping pages. Allocating 406 a PLB to a second mapping page may generally include defining the ownership of the PLB to the second mapping page. For example, flush ownership process 10 determines the ownership of each mapping page (e.g., a top-level mapping page, a mid-level mapping page, or a leaf mapping page). In some implementations, flush ownership process 10 allocates 406 a PLB to a second mapping page when ingesting or processing an IO request. For example, when an IO request is processed, flush ownership process 10 uses persistent memory organization policy 510 to determine whether the IO request is processed using the set of page buffers or using the set of PLBs. As described above, flush ownership process 10 may allocate a PLB to a second mapping page such that subsequent processing of the PLBs results in the most efficient flushing possible. For example, as PLBs and page buffers have distinct flushing procedures, flush ownership process 10 allocates a PLB (e.g., PLBs 514, 516, 518) to a second mapping page (e.g., mapping pages 522, 524, 526, respectively) such that PLBs 514, 516, 518 are processed (e.g., flushed) sequentially. For example, flush ownership process 10 may define chunks of PLBs to allocate 406 to contiguous mapping pages. In one example, suppose flush ownership process 10 is allocating 406 PLBs 514, 516, 518 to mapping pages. In this example, suppose a plurality of leaf mapping pages are contiguous and all map to the same mid-level mapping page. Flush ownership process 10 may allocate 406 PLB 514 to a first leaf mapping page (e.g., mapping page 522); PLB 516 to a second leaf mapping page (e.g., mapping page 524); and PLB 518 to a third leaf mapping page (e.g., mapping page 526). In this example, flush ownership process 10 allocates 406 PLBs 514, 516, 518 to contiguous leaf mapping pages to allow for mid-level mapping page-based flushing (i.e., by flushing at the mid-level mapping page granularity).

In some implementations, flush ownership process 10 uses the logical address of the IO request to allocate the PLB or page buffer to a particular mapping page. In one example, when determining whether to allocate a PLB or a page buffer to a mapping page, flush ownership process 10 determines the logical address associated with the IO request, divides the logical address by the size of the mapping page, and perform modulo 100 (e.g., (LBA/2 MB) % 100). However, it will be appreciated that other calculations may be performed using the logical address to allocate the PLB and the page buffers to particular mapping pages within the scope of the present disclosure.

In some implementations, flush ownership process 10 processes 408 one or more IO requests using one or more of the first mapping page and the second mapping page. For example, flush ownership process 10 may use the mapping pages (e.g., first mapping page and/or second mapping page) to persist data from IO requests within the storage system. In some implementations and as discussed above, flush ownership process 10 may receive and process 408 one or more IO requests. Specifically, flush ownership process 10 may process 408 one or more write IO requests that write data to the storage system. Processing 408 the one or more write IO requests may include generating and allocating PLBs and/or page buffers as described above. Flush ownership process 10 may persist the data on the PLB(s) or the page buffer(s) and provide an acknowledgment signal to the source of the IO request. After a period of time, flush ownership process 10 may flush the write data from log memory system 500 to long term storage in storage array 112.

In some implementations, processing 408 the one or more IO requests using the first mapping page includes flushing 410 data from the first mapping page by flushing the set of page buffers to the storage system. For example, flushing 410 data from the first mapping page by flushing the set of page buffers may include aggregating a predefined number of page buffers of the same mapping page (e.g., leaf mapping page/mid-level mapping page), binding them to particular mapping pages, and writing the page buffer data on PLBs in storage array 112. As shown in FIG. 5, flush ownership process 10 may flush 410 data from mapping page 520 by flushing page buffers 504, 506, 508 to storage array 112.

In some implementations, processing 408 the one or more IO requests using the second mapping page includes flushing 412 data from the second mapping page by flushing the PLB to the storage system. For example, flushing 412 data from the second mapping page by flushing the PLB may include obtaining a single or partial PLB and binding it to the mapper metadata tree. As shown in FIG. 5, flush ownership process 10 may flush 412 data from mapping pages 522, 524, 526 by flushing PLBs 514, 516, 518, respectively. In some implementations, there may not be any dependency between two mapping pages (e.g., leaf mapping pages), so flushing can involve different mapping pages by flushing them together in a page buffer flush and a PLB flush. In this example, the mapping page data may be on the same PLB from the page buffer flush.

In some implementations, flush ownership process 10 monitors 414 a ratio of the plurality of page buffers to the plurality of PLBs within the log memory system. For example, flush ownership process 10 may monitor 414 the data of inflight ingested page buffers and inflight ingested PLBs and sample it every period (e.g., every ten milliseconds) to determine a ratio or average percentage of page buffer and PLB since that last sampling.

In some implementations, flush ownership process 10 iteratively adjusts 416 the persistent memory organization policy based upon, at least in part, the ratio of the plurality of page buffers to the plurality of PLBs within the log memory system. For example, suppose that flush ownership process 10 samples the ratio of the plurality of page buffers to the plurality of PLBs and determines that the ratio of the plurality of page buffers to the plurality of PLBs is different from the ration of the plurality of page buffers to the plurality of PLBs described in persistent memory organization policy 510. In this example, flush ownership process 10 iteratively adjusts 416 the percentage ratio so it will cause the storage system to ingest the right percentage of page buffer and PLB. In some implementations, flush ownership process 10 iteratively adjusts 416 the ratio by changing the percent in iterative adjustments or steps and sampling the ratio at each adjustment to determine whether the ratio of the plurality of page buffers to the plurality of PLBs is consistent with persistent memory organization policy 510. In one example, suppose the percentage of page buffers specified in persistent memory organization policy 510 is 40% and the percentage of PLB is 60%. However, suppose that flush ownership process 10 monitors 414 the actual percentage is 50% PB and 50% PLB. In this example, flush ownership process 10 determines an iterative step (e.g., 5%) and adjusts 416 the page buffer percentage to 35% and the PLB percentage to 65%. Flush ownership process 10 continues adjusting until the monitored ratio is within a predefined threshold of the ratio specified by persistent memory organization policy 510.

General

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object-oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general-purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
generating a plurality of page buffers from a log memory system of the storage system using a persistent memory organization policy;
generating a plurality of physical layer blocks (PLBs) from the log memory system using the persistent memory organization policy;
allocating a set of page buffers from the plurality of page buffers to a first mapping page of a plurality of mapping pages;
allocating a PLB from the plurality of PLBs to a second mapping page of the plurality of mapping pages; and
processing one or more IO requests using one or more of the first mapping page and the second mapping page.

2. The computer-implemented method of claim 1, wherein the plurality of page buffers are located in non-volatile random-access memory (NVRAM) persistent storage within the log memory system.

3. The computer-implemented method of claim 2, wherein the plurality of PLBs are located in solid state drive (SSD) persistent storage within the log memory system.

4. The computer-implemented method of claim 3, wherein processing the one or more IO requests using the first mapping page includes flushing data from the first mapping page by flushing the set of page buffers to the storage system.

5. The computer implemented method of claim 4, wherein processing the one or more IO requests using the second mapping page includes flushing data from the second mapping page by flushing the PLB to the storage system.

6. The computer implemented method of claim 4, further comprising:
monitoring a ratio of the plurality of page buffers to the plurality of PLBs within the log memory system.

7. The computer implemented method of claim 6, further comprising:
iteratively adjusting the persistent memory organization policy based upon, at least in part, the ratio of the plurality of page buffers to the plurality of PLBs within the log memory system.

8. A computer program product residing on a non-transitory computer readable medium having a plurality of instructions stored thereon which, when executed by a processor, cause the processor to perform operations comprising:
generating a plurality of page buffers from a log memory system of the storage system using a persistent memory organization policy;
generating a plurality of physical layer blocks (PLBs) from the log memory system using the persistent memory organization policy;
allocating a set of page buffers from the plurality of page buffers to a first mapping page of a plurality of mapping pages;
allocating a PLB from the plurality of PLBs to a second mapping page of the plurality of mapping pages; and
processing one or more IO requests using one or more of the first mapping page and the second mapping page.

9. The computer program product of claim 8, wherein the plurality of page buffers are located in non-volatile random-access memory (NVRAM) persistent storage within the log memory system.

10. The computer program product of claim 9, wherein the plurality of PLBs are located in solid state drive (SSD) persistent storage within the log memory system.

11. The computer program product of claim 10, wherein processing the one or more IO requests using the first mapping page includes flushing data from the first mapping page by flushing the set of page buffers to the storage system.

12. The computer program product of claim 11, wherein processing the one or more IO requests using the second mapping page includes flushing data from the second mapping page by flushing the PLB to the storage system.

13. The computer program product of claim 11, wherein the operations further comprise:
monitoring a ratio of the plurality of page buffers to the plurality of PLBs within the log memory system.

14. The computer program product of claim 13, wherein the operations further comprise:
iteratively adjusting the persistent memory organization policy based upon, at least in part, the ratio of the plurality of page buffers to the plurality of PLBs within the log memory system.

15. A computing system comprising:
a memory; and
a processor configured to generate a plurality of page buffers from a log memory system of the storage system using a persistent memory organization policy, to generate a plurality of physical layer blocks (PLBs) from the log memory system using the persistent memory organization policy, to allocate a set of page buffers from the plurality of page buffers to a first mapping page of a plurality of mapping pages, to allocate a PLB from the plurality of PLBs to a second mapping page of the plurality of mapping pages, and to process one or more IO requests using one or more of the first mapping page and the second mapping page.

16. The computing system of claim 15, wherein the plurality of page buffers are located in non-volatile random-access memory (NVRAM) persistent storage within the log memory system.

17. The computing system of claim 16, wherein the plurality of PLBs are located in solid state drive (SSD) persistent storage within the log memory system.

18. The computing system of claim 17, wherein processing the one or more IO requests using the first mapping page includes flushing data from the first mapping page by flushing the set of page buffers to the storage system.

19. The computing system of claim 18, wherein processing the one or more IO requests using the second mapping page includes flushing data from the second mapping page by flushing the PLB to the storage system.

20. The computing system of claim 18, wherein the processor is further configured to:
monitor a ratio of the plurality of page buffers to the plurality of PLBs within the log memory system; and
iteratively adjust the persistent memory organization policy based upon, at least in part, the ratio of the plurality of page buffers to the plurality of PLBs within the log memory system.

* * * * *